United States Patent [19]

Richter

[11] Patent Number: 5,058,335
[45] Date of Patent: Oct. 22, 1991

[54] ANTI-ROOSTING DEVICE AND METHOD

[76] Inventor: Alan J. Richter, 3130 N. 34 St., Hollywood, Fla. 33021

[21] Appl. No.: 423,776

[22] Filed: Oct. 18, 1989

[51] Int. Cl.5 ............................................ A01M 29/00
[52] U.S. Cl. ........................................ 52/101; 119/59
[58] Field of Search .................... 52/101, 147; 256/11, 256/12; 24/16 PB; 119/1, 59

[56] References Cited

U.S. PATENT DOCUMENTS

| 996,545 | 6/1911 | Warner . |
| 1,037,111 | 8/1912 | Bethel . |
| 1,286,416 | 12/1918 | Rix . |
| 2,142,371 | 1/1939 | Peles . |
| 2,258,803 | 10/1941 | Peles . |
| 2,298,194 | 10/1942 | Caldwell . |
| 2,304,593 | 12/1942 | Peles . |
| 2,306,080 | 12/1942 | Peles . |
| 2,308,893 | 1/1943 | Pavloff .................................. 52/101 |
| 2,456,731 | 12/1948 | Peles ...................................... 52/101 |
| 2,938,243 | 5/1960 | Peles . |
| 2,938,244 | 5/1960 | Christensen ............................ 256/11 |
| 3,282,000 | 11/1966 | Shaw ...................................... 52/101 |
| 3,292,319 | 12/1966 | McCarthy . |
| 3,362,115 | 1/1968 | Nyhus . |
| 3,400,503 | 9/1968 | Schaller . |
| 3,407,550 | 10/1968 | Shaw ...................................... 52/101 |
| 4,143,437 | 3/1979 | Voykin . |
| 4,191,334 | 3/1980 | Bulanda ............................ 24/16 PB |
| 4,748,778 | 6/1988 | Rafter, Sr. . |
| 4,866,816 | 9/1989 | Caveney ............................ 24/16 B |

FOREIGN PATENT DOCUMENTS 2153644A 8/1985 United Kingdom .

Primary Examiner—John E. Murtagh
Attorney, Agent, or Firm—Calfee, Halter & Griswold

[57] ABSTRACT

A device and a method for protecting a structure, especially a wire or cable-like structure, against roosting of birds. The device comprises an array of flexible, plastic fingers extending away from the wire or cable-like structure in a predetermined pattern. Each of the flexible, plastic fingers is flexible enough such that when a bird attempts to land thereon, the finger will flex relative to the wire or cable-like structure, thereby deterring the bird from landing on the wire or cable-like structure. The flexing capability of the fingers is designed to frustrate a bird from landing thereon, and the structure of the fingers is designed to minimize the risk of injury to the bird.

25 Claims, 14 Drawing Sheets

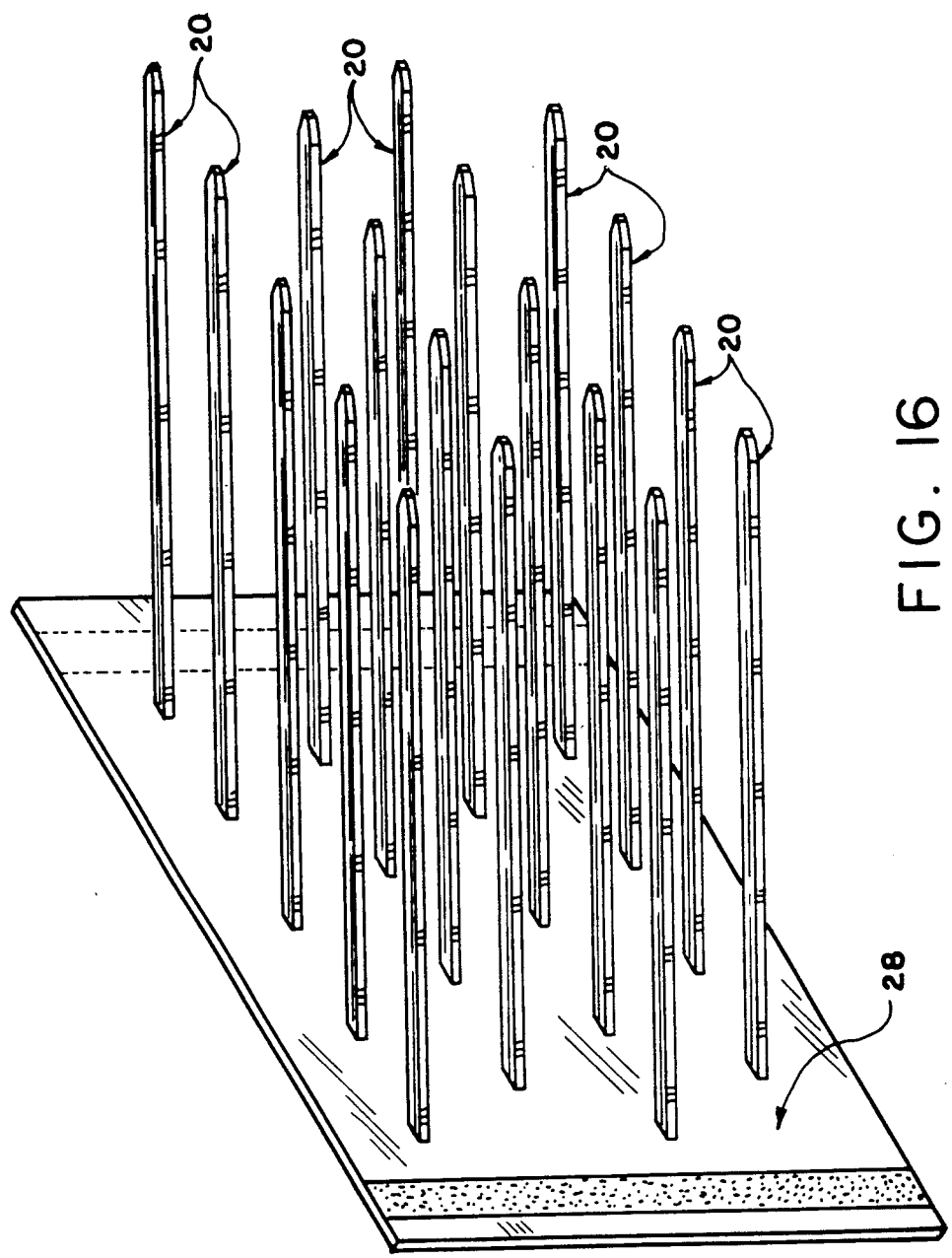

ANTI-ROOSTING DEVICE AND METHOD

TECHNICAL FIELD

The present invention relates to a device for preventing birds from roosting on outdoor structures such as cables, wires, or similar structures. Further, it relates to a method of constructing a device for protecting such structures against roosting of birds.

BACKGROUND OF THE INVENTION

Roosting of birds on static outdoor structures (e.g., buildings, buoys, telephone lines, electrical transmission lines, etc.) and on moveable structures (e.g., boats) has been a problem for many years. The droppings of roosting birds physically and visually damage the structures and objects underlying the structures. Further, birds attempting to roost on live portions of electric wires and cables can cause electrical arcing and circuit interruptions in such wires and cables.

Over the years many different types of devices have been suggested for preventing birds from roosting on various types of outdoor structures, e.g., buildings, buoys, etc. Such devices are designed to protect the structure, and objects underlying the structure, from damage from the droppings of birds that would otherwise roost on the structure.

For example, as shown by U.S. Pat. Nos. 2,304,593; 2,258,803; 2,142,371; 2,298,194; 2,306,080; and 996,545, one known device for preventing birds from roosting on a static structure such as a building includes sheet metal or wire bent or formed into predetermined shapes and attached to the structure to physically deter birds from gaining a foothold on the structure. As explained in those patents, a problem often encountered is how to physically deter the birds from roosting on the structure while avoiding physical harm to the birds. Such devices address the problem by forming the wire with special shapes (particularly at its distal ends) to avoid sharp points which might impale the birds.

Another known type of anti-roosting device designed especially for a buoy is shown in U.S. Pat. No. 4,143,437. The device comprises a series of wires and a support structure which supports the wires in a relatively delicately balanced position. When a bird attempts to land on one of the wires, the weight of the bird unbalances the device and causes it to tilt, thereby frightening the bird away.

Still another known device for preventing roosting of birds on marine craft is shown in U.S. Pat. No. 3,292,319. The device comprises wind rotated members attached to selected parts of the craft to visibly scare birds away from the protected parts of the craft.

Finally, yet another form of animal deterrent device is shown in U.S. Pat. No. 3,362,115. The device of that patent comprises a plastic sheath which is wrapped about a cable and has a series of tines formed by staples attached to the sheath. The staples have a length, rigidity and sharpness to repel cattle effectively from the cable.

To the applicant's knowledge, no one has addressed the problem of birds roosting on wire or cable-like structures such as the wires and cables used on marine craft, telephone lines, electrical transmission lines, water pipes, etc. Applicant believes such wire and cable-like structures need to be adequately protected against roosting of birds, because without such protection there is considerable danger of unsightly, unsanitary and corrosive droppings doing damage (visual and physical) to underlying objects, e.g., boat cabin, boat deck, walkways, buildings, vehicles, patios, driveways, etc. Further, there are risks of electrical arcing and circuit interruption due to birds attempting to roost on live portions of electrical wires and cables.

SUMMARY OF THE INVENTION

The present invention provides a new device which is especially useful for protecting a wire or cable-like structure against roosting of birds. Further, the invention provides a new and useful way of constructing the device.

The device of the present invention is relatively simple in construction, and is designed to be relatively easy and inexpensive to manufacture. Also, the device is easy to pack for shipping, and is easy to install on a wire or cable-like structure. The device is lightweight, and is designed so that when attached to a wire or cable-like structure (e.g., the shrouds or backstay of a boat), it does not interfere with the operation of the wire or cable-like structure. Moreover, the device is maintenance free (in comparison to bird repellants which are painted on a structure); noiseless (in comparison to rotating propeller-like devices), and non-conductive (which is particularly useful when applied to electrical cables). Finally, the device is designed to safely deter birds from landing thereon, or on the wire or cable-like structure protected thereby.

The device of the present invention comprises an array of flexible, plastic fingers extending away from the wire or cable-like structure in a predetermined pattern. Each of the flexible, plastic fingers is flexible enough such that when a bird attempts to land thereon, the finger will flex relative to the wire or cable-like structure, thereby detering the bird from landing on the wire or cable-like structure. The flexing capability of the fingers is designed to frustrate a bird from landing thereon, and the structure of the fingers is designed to minimize the risk of injury to the bird.

According to a preferred embodiment, the device comprises a series of subassemblies of the flexible, plastic fingers, which subassemblies can be connected with the wire or cable-like structure at predetermined locations. Each subassembly comprises a base which is adapted to surround the wire or cable-like structure and a series of the flexible, plastic fingers connected with the base. The subassembly can be formed by coupling the flexible, plastic fingers to the base, or by integrally molding the flexible, plastic fingers with the base. The base can comprise a relatively thin, longitudinally extending base strand, which encircles the wire or cable-like structure. Alternatively, it can comprise a relatively thin sheath (sheet) of material which encircles the wire or cable-like structure.

In protecting a wire or cable-like structure, according to the preferred form of the present invention, a series of subassemblies are initially formed, each subassembly comprising a base and a plurality of flexible, plastic fingers at predetermined locations on the base. Then, each subassembly is secured to the wire or cable-like structure by securing the base of the subassembly to a selected location on the wire or cable-like structure. When an appropriate number of the subassemblies have been secured to selected locations on the wire or cable-like structure, the plurality of flexible, plastic fingers will be disposed in a predetermined pattern on the wire or cable-like structure. The locations on the wire or cable-like structure to which the subassemblies are attached can be selected (and varied, if desired) to locate the flexible, plastic fingers at the most advantageous spots to deter roosting of the types of birds posing the biggest problem in a particular locale.

Moreover, according to a modified form of the invention, an orientation device can be connected with a plurality of the subassemblies before the subassemblies are attached to the wire or cable-like structure. The orientation device is designed to maintain a preferred orientation of the subassemblies on the wire or cable-like structure, both during attachment of the subassemblies and during prolonged use of the subassemblies.

The size and shape of the flexible plastic fingers is determined by the size and weight of birds posing the greatest problem in a particular locale. According to the one embodiment, applicant has successfully protected marine craft from birds such as starlings by forming the flexible, plastic fingers out of plastic, electrical ties, each having a length of from about 3.5 inches to about 6 inches, a width of from about 0.10 inches to about 0.14 inches, and a thickness of about 0.039 inches (1 mm). The ties can be made of Nylon 6/6 plastic.

Additionally, applicant has found that with the relatively thin flexible plastic fingers according to the preferred embodiment, an additional benefit is realized when the device is attached to a wire or the shroud of a marine craft. Specifically, the motion or vibration of the wire or cable-like structure, or an apparent wind velocity relative to the craft of about 5 mph or more, will cause the flexible plastic fingers visibly to wave or flex relative to the wire or cable-like structure. The motion of the fingers provides the additional benefit of visually detering a bird from landing on the device. Moreover, the flexibility of the plastic fingers minimizes the risk of damage to the structures which may brush against the protected wire or cable (e.g., the flexibility of the fingers may minimize the risk of damage to a sail which brushes against a protected wire or cable on a boat).

Also, while the invention is particularly useful in protecting wire or cable-like structures, certain of the structural features of the invention may also be useful in protecting relatively straight or flat structures (e.g., signs, billboards) against roosting of birds thereon.

The further objects and advantages of the present invention will become further apparent from the following detailed description and the accompanying drawings.

BRIEF DESCRIPTION OF THE DRAWINGS

FIG. 16 is a three dimensional illustration of still another embodiment of a device for preventing roosting of birds on a wire or cable-like structure or on a flat surface according to the principles of the invention;

DETAILED DESCRIPTION OF THE PREFERRED EMBODIMENT

As discussed above, the present invention relates to a device primarily intended for attachment to a wire or cable-like structure such as (i) the supporting elements of a boat mast (e.g., shrouds, spreader arms, backstay), (ii) telephone wires or cables, (iii) electrical transmission lines, (iv) water pipes, etc. The principles of the invention are described below as they are applied to form an anti-roosting device for the supporting elements of a boat mast (i.e., the shrouds, backstay and spreader arms). However, the manner in which the principles of the present invention can be used to form an anti-roosting device for various other types of wire or cable-like structures will become apparent to those of ordinary skill in the art.

In this application, reference to a "wire or a cable-like structure" is intended to mean an elongated longitudinally extending structure whose cross section has a substantially continuous outer periphery. Thus, it encompasses relatively rigid and flexible structures with continuous oval or cylindrical outer peripheries such as (i) the shrouds, and the backstay which support boat masts, (ii) the spreader arms on a boat mast, (iii) telephone cables and wires, (iv) electrical transmission lines, (v) conduits such as water pipes, etc. Further, the term encompasses braided cables whose outer peripheries are relatively cylindrical and which can be circumscribed by a flexible band or sheath. Moreover, the term also encompasses structures whose outer periphery is continuous but regularly or irregularly segmented (e.g., square, rectangle, hexagon, etc.) and which can be circumscribed by a flexible band or sheath.

Figure 1:
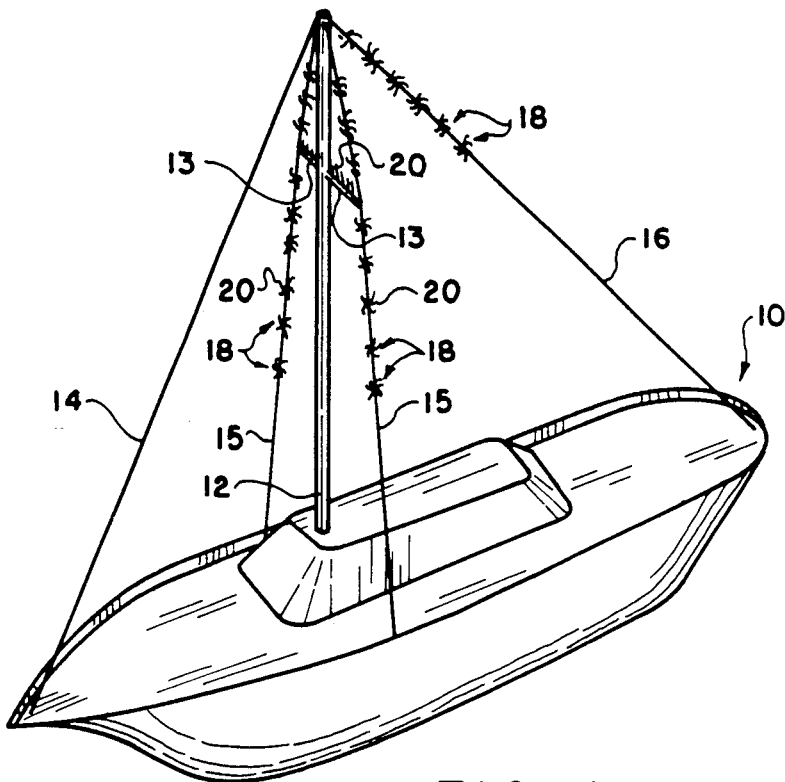
FIG. 1 is a schematic illustration of a boat showing areas primarily protected by the device according to the invention.

Referring to FIG. 1, a marine craft 10 is shown with (i) a vertically extending mast 12, (ii) a pair of spreader arms 13 connected to the mast 12, (iii) a forestay 14 connected between the mast 12 and the bow of the craft, (iv) a pair of shrouds 15 connected with the top of the mast, the spreader arms mast to the stern of the craft. In the applicant's experience, birds are most likely to attempt to roost on the upper ½ to ⅓ of the shrouds 15 and the backstay 16, and on the spreader arms 13. Thus, FIG. 1 schematically illustrates devices 18 constructed according to the principles of the invention located on the upper portions of the shrouds 15 and the backstay 16 and on the spreader arms 13. However, it will be apparent to those of ordinary skill in the art that a device according to the invention may be located in various places on the protected wire or cable-like structure, depending upon where birds are most likely to roost.

Figure 12:
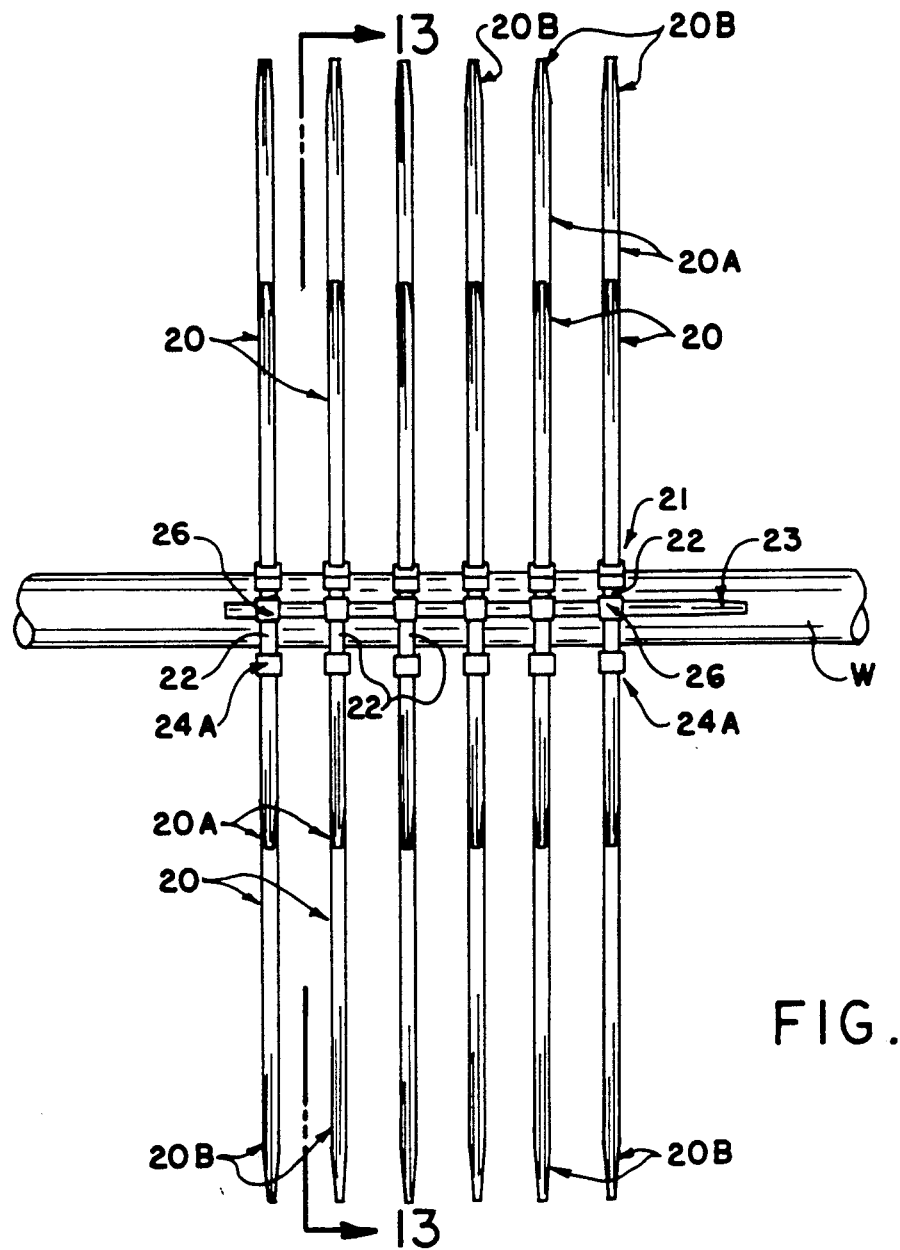
FIG. 12 is a plan view of a wire with a plurality of subassemblies and an orientation device connected thereto.
Figure 13:
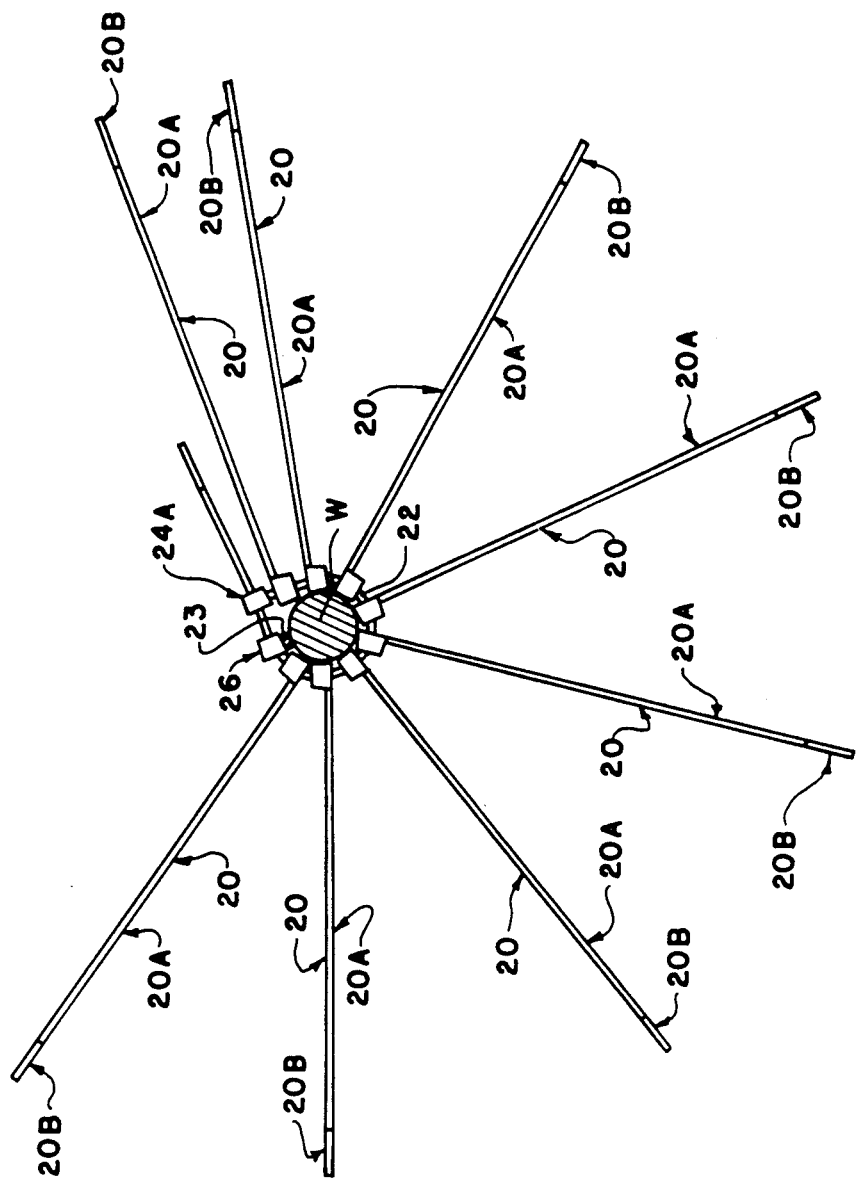
FIG. 13 is a sectional view of FIG. 12, taken from the direction 13—13.

Each of the devices 18 comprises a series of flexible, plastic fingers which are attached to the wire or cable in such a way that they extend away from the wire or cable in a predetermined pattern. The preferred embodiment of this invention comprises a series of subassemblies 21 (FIG. 12, 13), each comprising an annular array of the flexible, plastic fingers 20 attached to a respective base strand 22. The base strand 22 of each subassembly is attached to the wire or cable W with the flexible, plastic fingers 20 extending away from the wire or cable W (see e.g., FIGS. 12, 13). Again, according to the preferred embodiment, a series of such subassemblies are attached to the wire or cable W to locate the flexible, plastic fingers 20 in a predetermined pattern relative to the wire or cable.

Each of the flexible, plastic fingers 20 is relatively thin and is made of a plastic such as Nylon 6/6. Each flexible, plastic finger 20 has a longitudinally extending shaft 20A which is rectangular in cross section, and provides a relatively narrow landing perch for a bird seeking to land thereon. Further, each flexible, plastic finger 20 has a relatively rounded distal end 20B to avoid physically harming a bird engaging the end of the finger.

Figure 2:
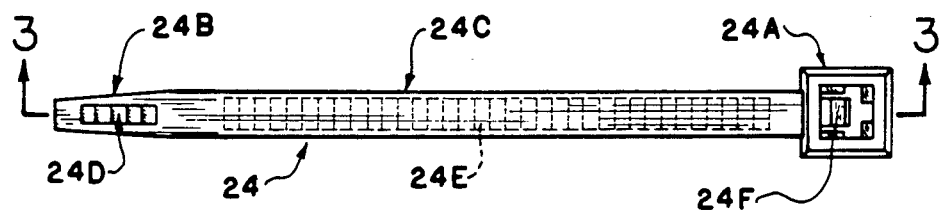
FIG. 2 is a plan view of a plastic, electrical cable tie which can be used in constructing a device according to the invention.
Figure 3:
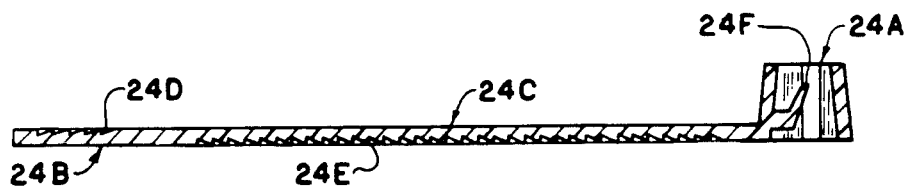
FIG. 3 is a cross sectional view of the plastic, electrical cable tie of FIG. 2, taken along the line 3—3.
Figure 4:
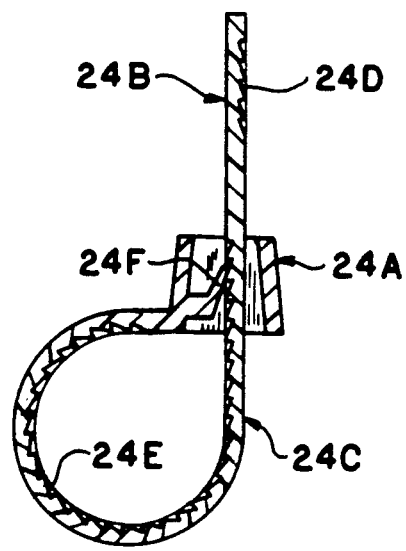
FIG. 4 is a fragmentary view of the plastic, electrical cable tie of FIGS. 2 and 3, and illustrating the locking action of the cable tie when it is wrapped around an object.

According to the preferred embodiment, each of the flexible, plastic fingers 20 can be made out of a conventional electrical cable tie. FIGS. 2-4 illustrate an electrical cable tie 24 which can be used to form a flexible finger for the device of the invention. The electrical cable tie 24 has a buckle portion 24A located at one end, a tongue portion 24B located at the other end and a shaft 24C extending therebetween. The tongue portion 24B and the shaft portion 24C have serrations forming locking teeth 24D, 24E thereon. The buckle 24A defines an opening and has a flexible locking tang 24F located therein. When the tongue 24B and the shaft 24C are looped about an object and inserted through the buckle 24A, the locking teeth 24E on the shaft can ratchet over the locking tang 24F as the shaft is drawn further through the buckle 24A (see FIG. 4). However, once the shaft 24C has been inserted into the buckle 24A by a desired amount, the locking tang 24F will lock against the nearest one of the teeth 24E to prevent retraction of the shaft 24C.

Figure 5:
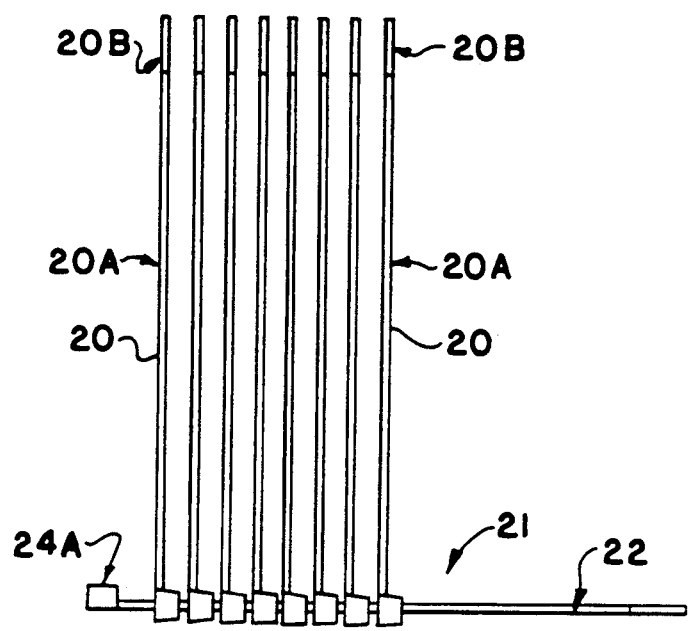
FIG. 5 is a plan view of a plurality of plastic, electrical cable ties forming a subassembly for attachment to a wire or cable-like structure.
Figure 6:
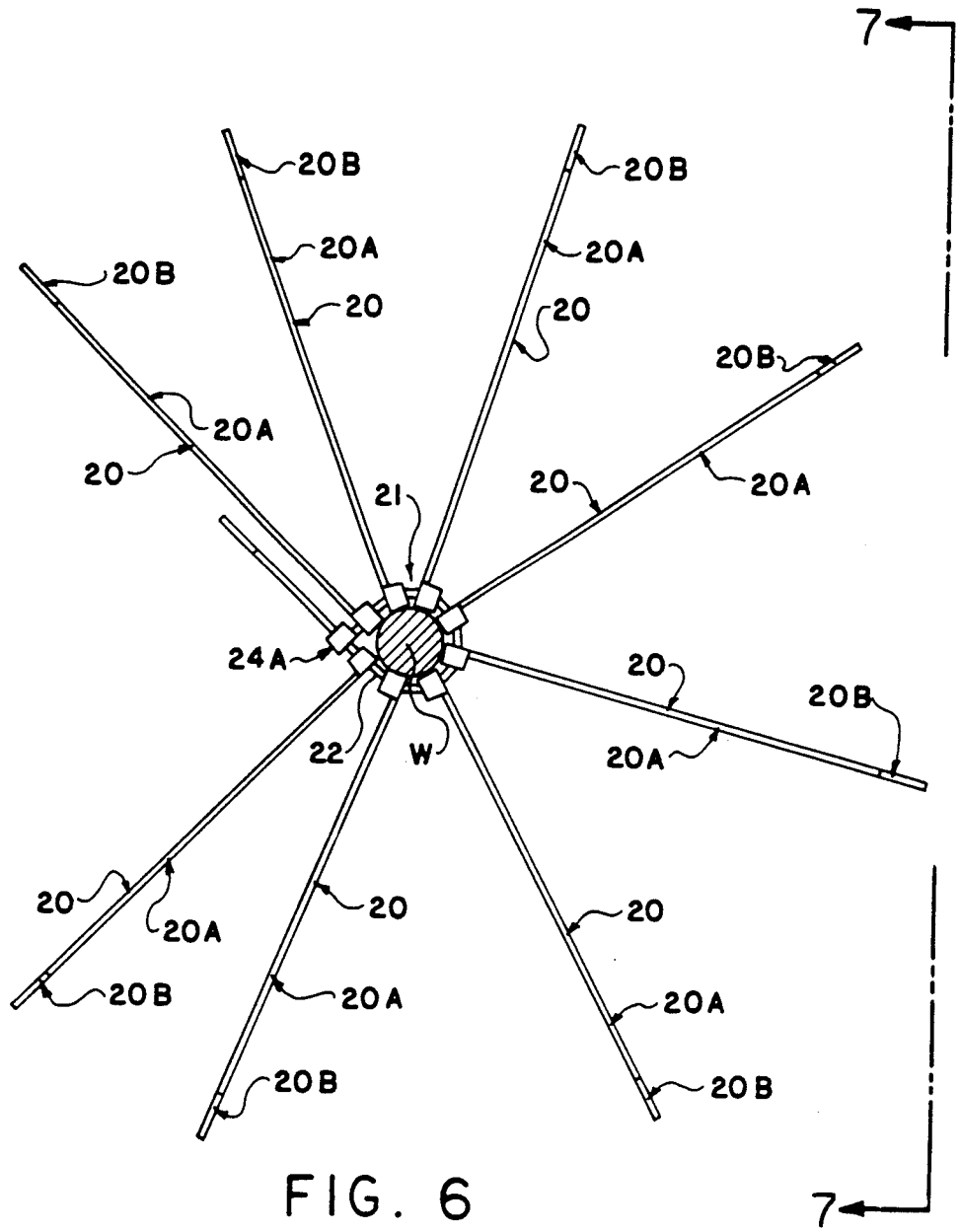
FIG. 6 is a sectional view of a wire or cable-like structure protected by the subassembly of FIG. 5.
Figure 7:
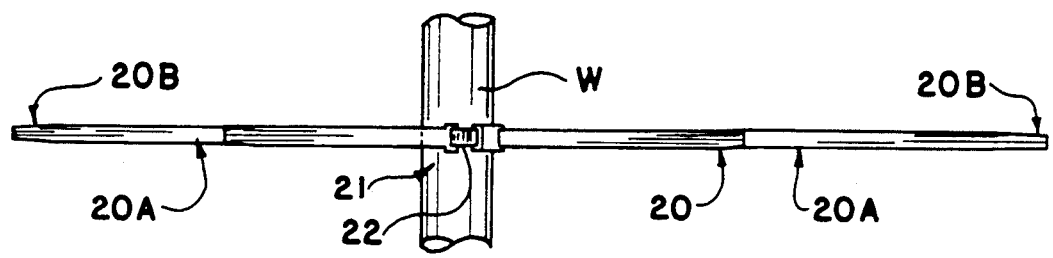
FIG. 7 is a side view of the wire and subassembly of FIG. 6, taken from the direction 7—7.

FIGS. 5, 6 and 7 show a single subassembly 21 with a plurality of flexible plastic fingers 20 secured to a flexible base strand 22. Each finger 20 and the base strand 22 comprises an electrical cable tie similar to that shown in FIGS. 2-4. As seen from FIGS. 5, 6 and 7, the buckle portions 24A of the fingers 20 essentially form loops which can be threaded onto the tongue and shaft of the one electrical cable tie that functions as the base strand 22.

When a series of ties are threaded onto a base strand 22 to form a subassembly 2!, the shafts and the tongues of the ties attached to the base strand 22 form the flexible fingers 20 of the subassembly. Since the buckle portions 24A are thicker than the shafts of the fingers, the buckle portions 24A cause the shafts of the cable ties to be spaced along the length of the base strand 22. Thus, the shafts of the ties which are threaded onto the base strand 22 are generally spaced from each other and the fingers 20 are disposed at predetermined locations along the base strand 22. If desired, an adhesive can be used further to secure the fingers 20 in place on the base strand 22.

After a subassembly 21 is formed, the subassembly is secured to a desired location on a wire or cable. FIGS. 6 and 7 show a subassembly connected to a wire or cable W. The base strand 22 of the subassembly is secured about a part of the wire or cable W, with the buckle portion 24A of the base strand mating with the tongue and shaft portions of the base strand to lock and tighten the base strand against the wire or cable W. This tightens the base strand 22 to the wire or cable W and locates the flexible, plastic fingers 20 so that their tongue and shaft portions extend away from the base strand 22 and away from the wire or cable W. If necessary, an additional adhesive can be used to further secure the base strand to the wire or cable W.

Figure 6A:
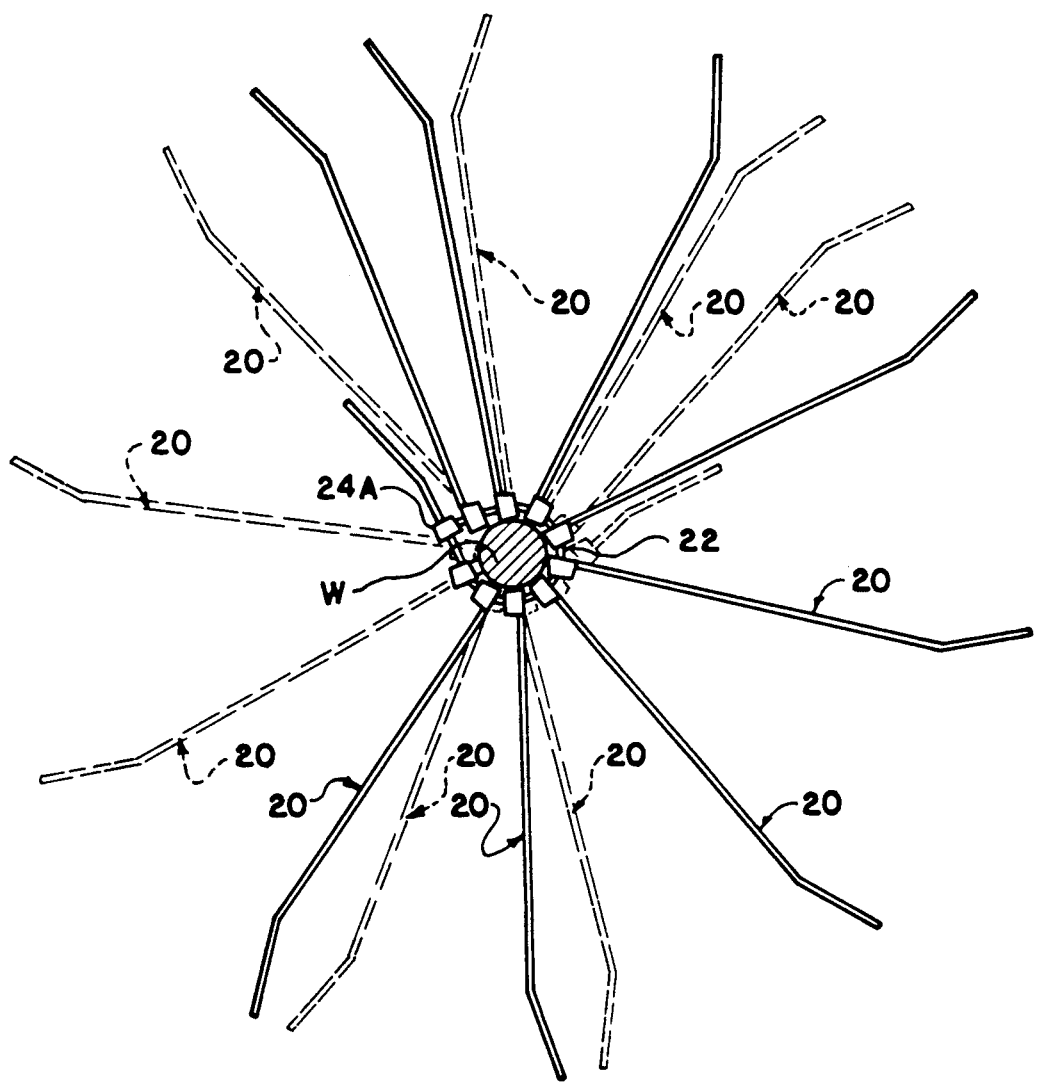
FIG. 6A is a view similar to FIG. 6, but showing an alternative form of the flexible plastic fingers and showing preferred orientations for adjacent subassemblies of the flexible plastic fingers.

It is preferred that a plurality of the subassemblies be attached to the wire or cable W to locate the flexible fingers at desired locations along the wire or cable. The number of fingers forming each of the subassemblies can be varied, depending upon factors such as (i) the number of fingers the circumference of the wire or cable will permit, and (ii) the relative spacing of the fingers permitted by the loop portions. The orientation of adjacent subassemblies and the number of subassemblies per unit length (density) are designed to most advantageously deter different size birds from lighting on the wire or cable. For example, FIG. 6A schematically illustrates the orientation of a pair of adjacent subassemblies using conventional flexible, plastic fingers 20 formed of electrical ties which are about 3½ inches long, 0.10 inches wide and 0.039 inches (1 mm) thick. As illustrated in FIG. 6A, the ties have bent portions near their distal ends. One subassembly, shown in full lines, locates the ties at various intervals about the periphery of a wire W. The ties of that subassembly are oriented so that their bent portions are oriented in one direction. An adjacent subassembly is shown in dashed lines. The adjacent subassembly has ties which are angularly offset from the ties of the first subassembly, and the ties are oriented so that their bent portions extend in the opposite direction to the bent portions of the ties of the first subassembly. Such a relative orientation of the subassemblies, with angularly offset fingers (and oppositely directed bent portions) is believed to be particularly useful where the subassemblies are attached individually to the wire or cable W.

Figure 21:
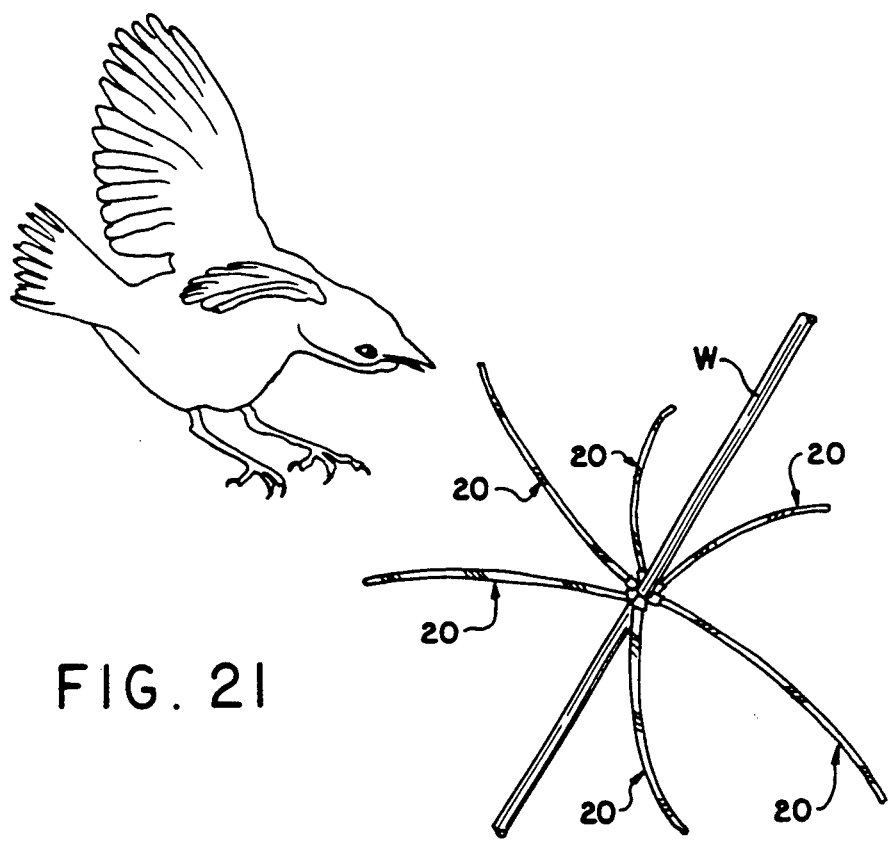
FIG. 21 schematically illustrates an anti-roosting device according to the invention, and a bird attempting to land thereon.
Figure 22:
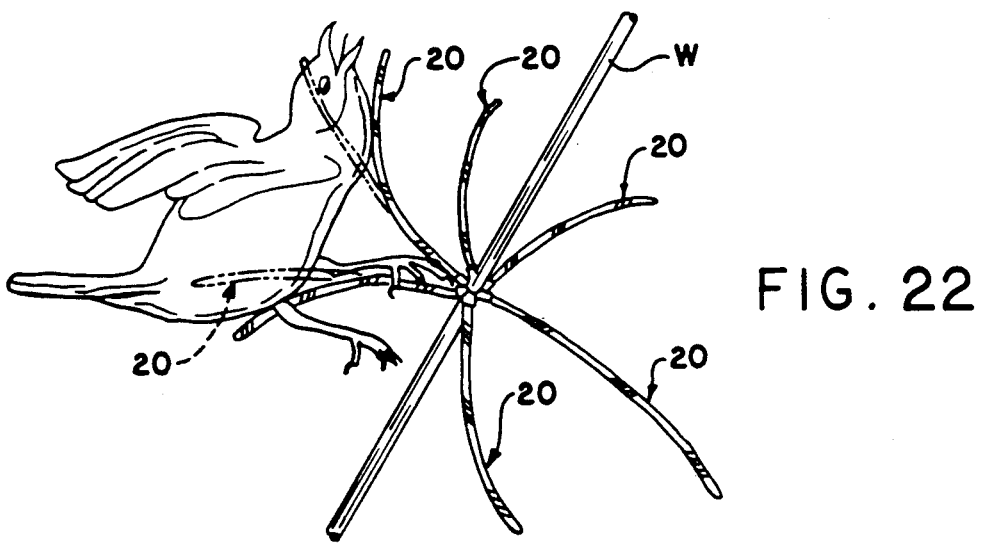
FIG. 22 schematically illustrates the manner in which the flexible fingers of the device resiliently, according to the principles of this invention, deter a bird from roosting thereon.

As discussed above, the flexible, plastic fingers 20 are adapted to flex when a bird attempts to land thereon. When used on the wires or cables of a marine craft, the plastic fingers 20 will flex relative to the wire or cables should a bird attempt to land thereon. FIGS. 21 and 22 schematically illustrate the manner in which the flexible, plastic fingers 20 will deter a bird from landing on the wire or cable W protected by the device of the invention. As a bird approaches the protected wire or cable W (FIG. 21), the bird will attempt to land on one of the flexible fingers 20. As the bird engages the one of the fingers 20, the finger will resiliently flex (FIG. 22). The vertical deflection characteristics of a cable tie which is 5½ inches long, 0.14 inches wide and about 0.039 inches (1 mm) thick, under different weight objects, and measured at the end of the tongue portion of the tie, is believed to be approximately as follows:

| Weight (Object) | Deflection |
| --- | --- |
| 100 mg | 7 mm |
| 500 mg | 22 mm |
| 1 gram | 35 mm |
| 2 grams | 55-60 mm |
| 5 grams | 90 mm |
| 15 grams | virtually complete deflection |

Such flexing (and subsequent vibration) of the fingers either startles the bird, or frustrates the bird from gaining a secure perch on the fingers 20. Thus, the bird will be discouraged from gaining a perch on the fingers, or on the wire or cable protected thereby.

An additional benefit of protecting a wire or cable by the flexible, plastic fingers of the invention is that the flexibility of the plastic fingers also helps minimize the risk of injury to a bird seeking to land on a wire or cable protected by the flexible, plastic fingers. Specifically, because the plastic fingers can flex when they encounter any part of the bird's body (see FIG. 22), the fingers minimize the risk of impaling a bird seeking to land thereon.

Still another benefit of the flexible, plastic fingers of the invention is that they may provide a visible deterrent to a bird seeking to land thereon. Specifically, the deflection and vibration characteristics of cable tied which are about 5½ inches long, 0.14 inches wide and 0.039 inches (1 mm) thick are believed to be about as follows:

| Wind Speed | Deflection | Vibration |
| --- | --- | --- |
| 5 M.P.H. | 3-5 mm | Yes |
| 10 M.P.H. | 5-7 mm | Yes |
| 15 M.P.H. | 10-15 mm | Yes |

| Wind Speed | Deflection | Vibration |
| --- | --- | --- |
| 20 M.P.H. | 20-30 mm | Yes |

Thus, any motion, vibration or wind velocity of at least 5 M.P.H. will cause the fingers to deflect and vibrate enough to provide a visible deterrent which should discourage most birds from even seeking to gain a perch thereon.

Further, while the preferred embodiment illustrates a subassembly made by a base strand and a series of fingers secured to the base strand, it is also contemplated that the base strand and the fingers could be integrally molded together as a single plastic article. With such a structure the base strand would have a buckle at one end, a tongue at the other end and the fingers would be integrally molded to a shaft extending between the buckle and the tongue. The device would then be attached to a wire or cable-like structure by tightening the base strand about the wire or cable in the same way described above, and if desired, by adding additional adhesive to secure the device in place on the wire or cable-like structure. The advantage of molding the base strand with the fingers is that the device is relatively simple and inexpensive to construct and precisely locates the flexible, plastic fingers at precise locations to optimize their function.

Figure 8:
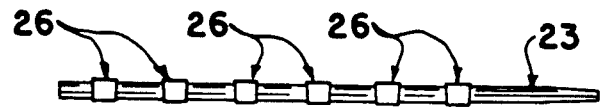
FIG. 8 is a top plan view of an orientation device for use in connection with one or more subassemblies, according to one aspect of the invention.
Figure 9:
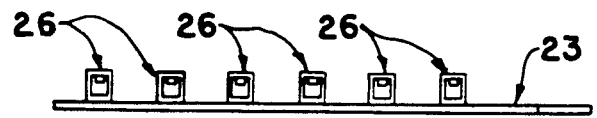
FIG. 9 is a side plan view of the orientation device of FIG. 8.
Figure 10:
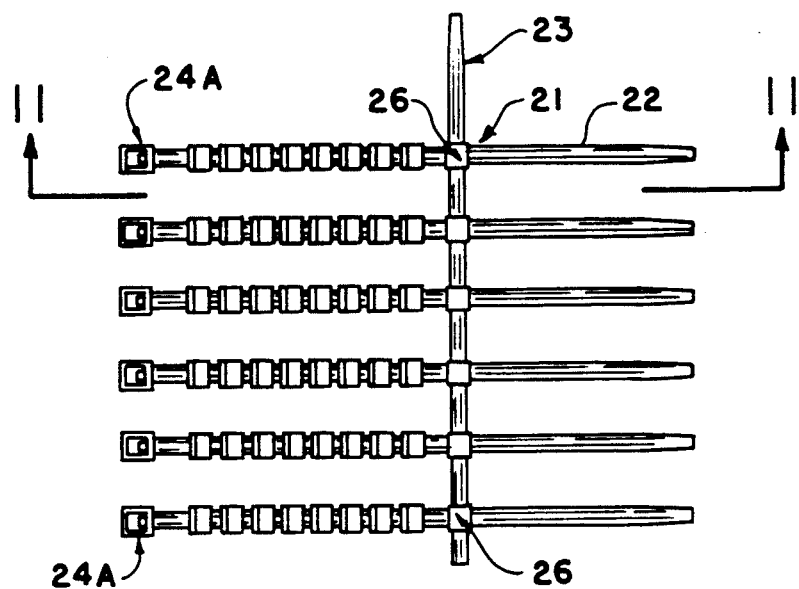
FIG. 10 is a top plan view of a plurality of subassemblies connected to an orientation device.
Figure 11:
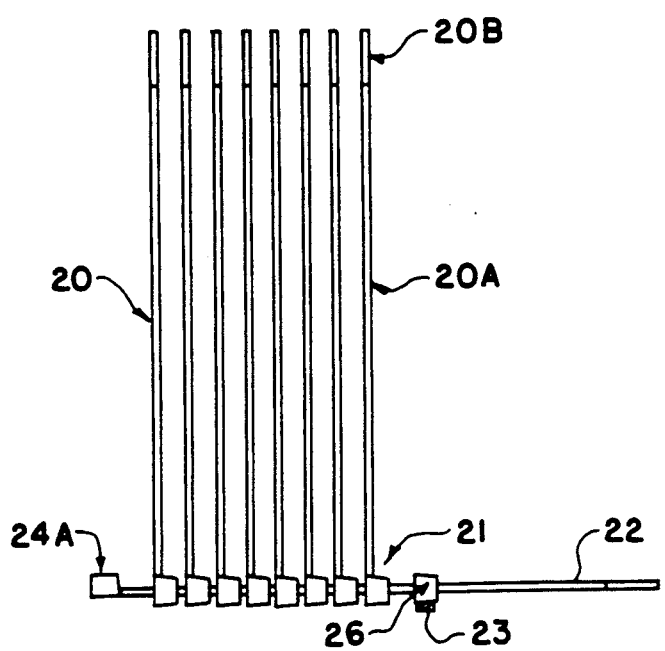
FIG. 11 is a section view of FIG. 10, taken from the direction 11—11.

An additional feature of the present invention is shown in FIGS. 8-13. Specifically, in addition to the series of subassemblies, an orientation device may be provided for aligning and spacing the subassemblies on a wire or cable. The orientation device is shown in FIGS. 8 and 9. It comprises a plastic orientation strip 23 with a series of loops or buckles 26 integrally attached thereto. The loops or buckles 26 could be similar in shape to the buckles of the electrical ties illustrated in FIGS. 2-4. The orientation strip 23 could be in any length and can have any desired number of loops or buckles 26 per unit length of the strip. Moreover, the density of subassemblies secured to a plastic strip can be varied to produce a desired density of subassemblies on a wire or cable.

The purpose of the orientation device is to prevent rotation of the subassemblies 21 and to maintain the spacing of each of the subassemblies 21 when the subassemblies are attached to a wire or cable. Specifically, during assembly of the device onto a wire or cable, a plurality of the subassemblies 21 are threaded through respective loops or buckles 26 on the orientation strip 23 (see FIGS. 10 and 11). The orientation strip 23 is then placed against the wire or cable W, and the base strand of each of the subassemblies is tightened about the wire or cable in the manner described previously, to secure and maintain the subassemblies in a particular orientation on the wire or cable (see FIGS. 12 and 13). In the event the subassemblies are integrally molded as a single unit, it is also contemplated that an orientation device may also be molded with the subassemblies.

In the devices of FIGS. 5-13, the flexible, plastic fingers of each subassembly are shown as extending generally in a common plane. However, it is contemplated that the flexible, plastic fingers 20 of any given subassembly could have intermediate bends which allow increased spacing between subassemblies, and thereby reduce the density of fingers and subassemblies which need to be attached to a given length of wire or cable to effectively deter birds from roosting on that length of wire or cable. It should be noted that any intermediate bends in the fingers must ultimately result in the tips of the fingers radiating straight out or perpendicular to the long axis of the wire.

Figure 14:
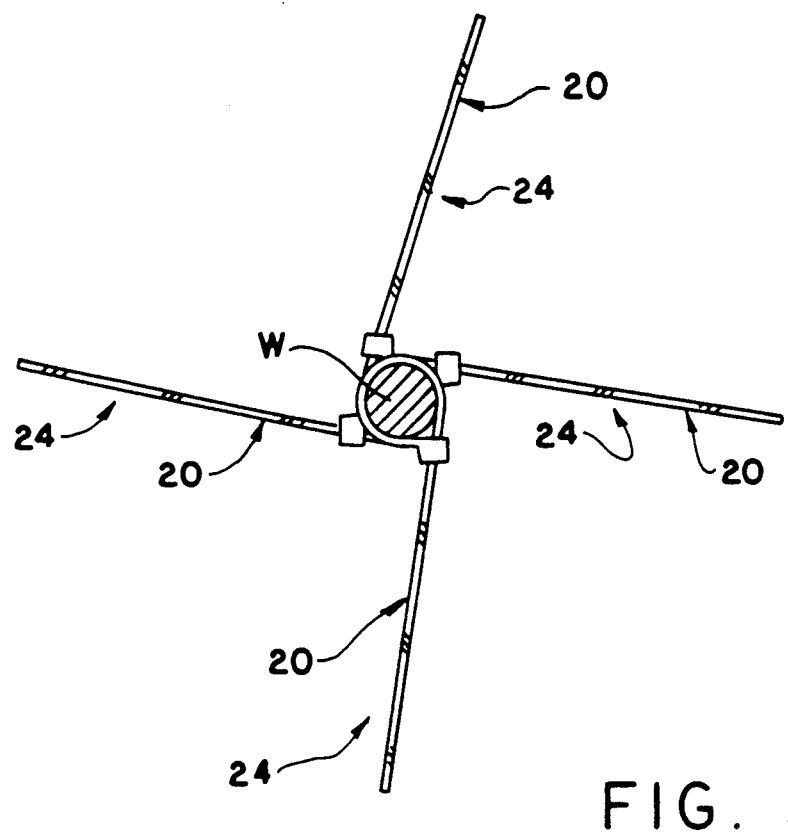
FIG. 14 is a sectional view of a wire or cable with separate plastic, electrical cable ties connected directly thereto and forming a device according to another embodiment of the present invention.
Figure 15:
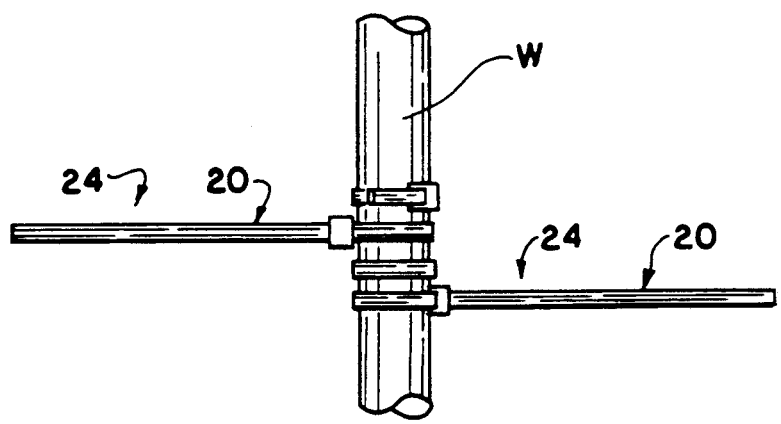
FIG. 15 is a side view of the device of FIG. 14.

FIGS. 14 and 15 show still another modified version of a device according to the principles of the present invention. In FIGS. 14 and 15, the device of the invention is formed by attaching individual electrical ties 24 directly to the protected wire or cable W. The shafts and tongues of the electrical ties extend away from the wire or cable W to form the flexible fingers 20. As seen from FIGS. 14 and 15, the cable ties are located to orient the flexible, plastic fingers 20 at different locations about the periphery of the wire or cable W.

FIG. 16 shows a modified version of a device according to the invention. In FIG. 16, rather than a relatively thin base strand, the base comprises a relatively thin sheath (sheet) 28 of material. The sheath 28 has the flexible, plastic fingers 20 secured thereto, or integrally molded therewith. The sheath can be secured to a wire or cable-like structure by securing the sheath around the wire or cable-like structure and by fastening the sheet in place by means of ties, adhesive, Velcro-type hook and loop connectors, or combinations thereof. Further, the device of FIG. 16 can also be attached to a relatively flat, horizontal straight surface (e.g., the ledge of a building) with the flexible, plastic fingers extending away from the horizontal surface in an upward, vertical direction designed to deter birds from roosting on the surface.

In each of the foregoing embodiments, the flexible, plastic fingers are located to substantially circumscribe the wire or cable-like structure. However, it will be clear to those of ordinary skill in the art that an array of the flexible, plastic fingers can circumscribe only a selected part of a wire or cable-like structure, where only the part of the wire or cable-like structure is likely to have birds attempt to roost thereon. Referring back to FIG. 1, note that the spreader arms 13 are shown as protected by a plurality of devices comprising flexible, plastic fingers 20 constructed according to the principles of the invention. Applicant has found that it is primarily important for the fingers 20 to extend vertically upward from the spreader arms 13, in order to protect the spreader arms. The fingers 20 can be applied individually to the spreader arms 13, in the manner described in connection with FIGS. 14, 15, but with the fingers 20 oriented only vertically. Further, the fingers would be applied to the spreader arms 13 in such a manner that the vertically extending fingers extend alternately from the front and rear edges of the spreader arms 13. Note also that while a base which completely circumscribes the wire or cable-like structure is preferred, the base (i.e., the base strand or the sheath) can be adapted to circumscribe only so much of the wire or cable-like structure as is necessary to enable the base to be effectively secured to the wire or cable-like structure, and to enable the fingers to be effectively located relative to the wire or cable-like structure.

Still further, the flexible plastic finger concept of the invention may be used to create anti-roosting devices for attachment to relatively narrow edges of structures such as the top edges of signs or billboards or marine day markers. For example, FIGS. 17 and 18 illustrate a band of material 40 with fingers 20 which (except for their bent distal portions) are generally parallel to and co-planar with the plane of the band of material 40.

Figure 18:
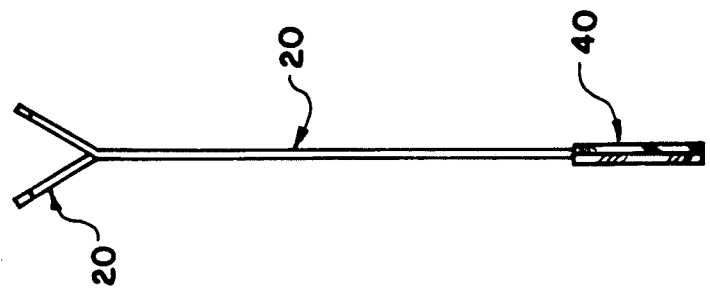
FIG. 18 is a side view of the device of FIG. 17, taken from the direction 18—18.
Figure 17:
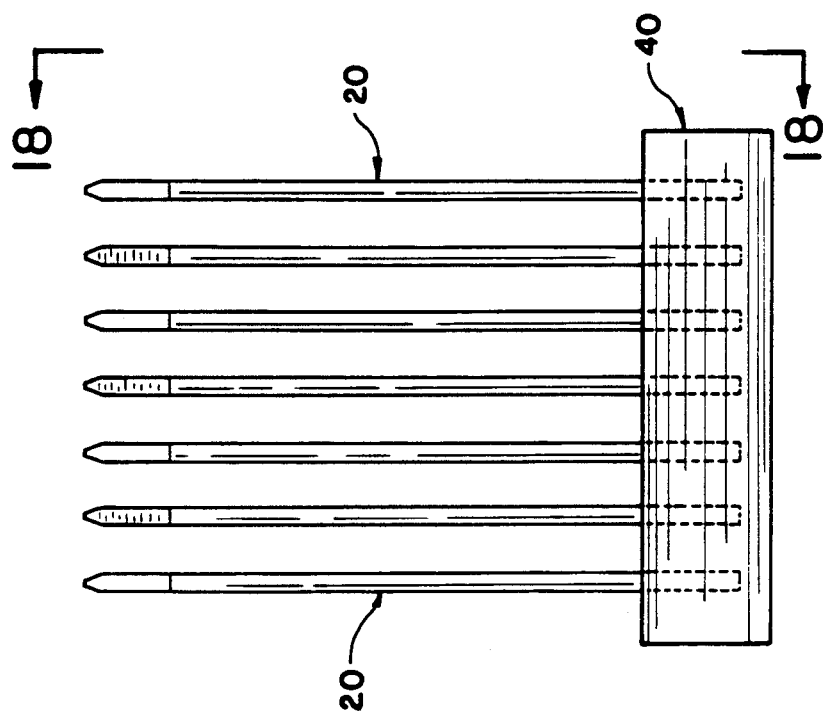
FIG. 17 is a front elevational view of a device constructed according to certain of the principles of the present invention, and designed for attachment to the top front edge of a relatively flat structure for detering roosting of birds thereon.
Figure 17A:
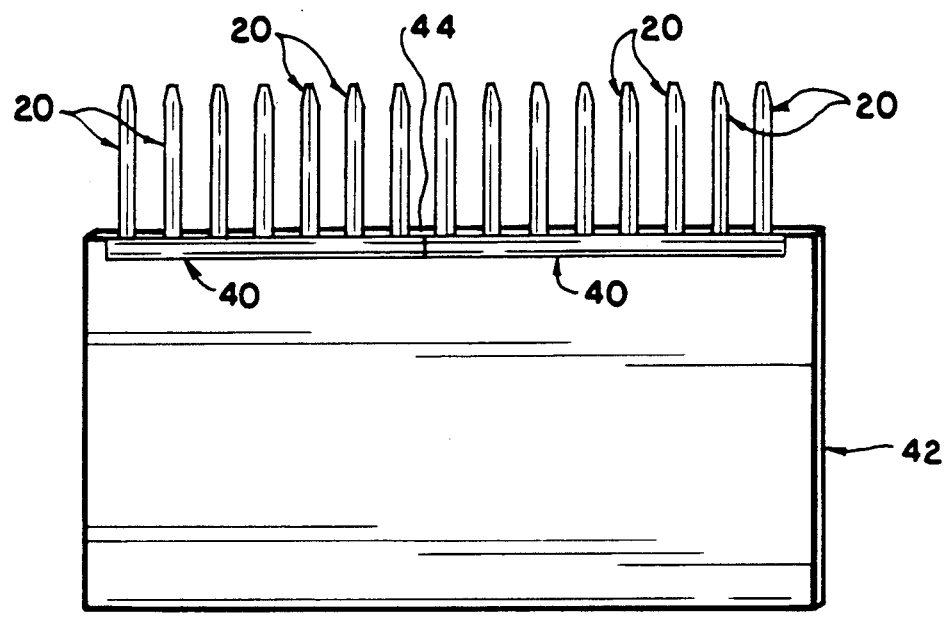
FIG. 17A is a schematic illustration of a relatively narrow, flat structure (e.g., a sign) with the device of FIG. 17 attached thereto.
Figure 19A:
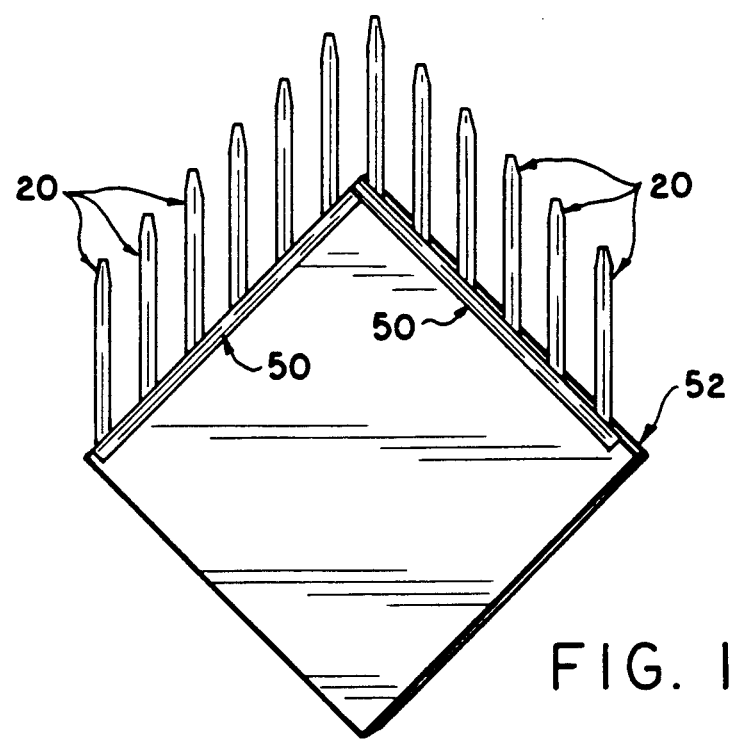
FIG. 19A is a schematic illustration of a relatively narrow, flat structure such as a diamond-shaped marine day marker with a device according to FIG. 19 attached thereto.
Figure 20:
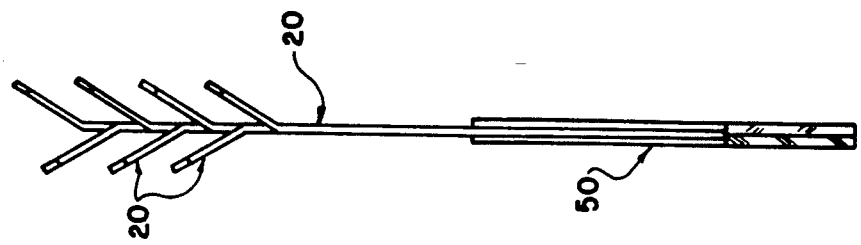
FIG. 20 is a side view of the device of FIG. 19, taken from the direction 20—20.
Figure 19:
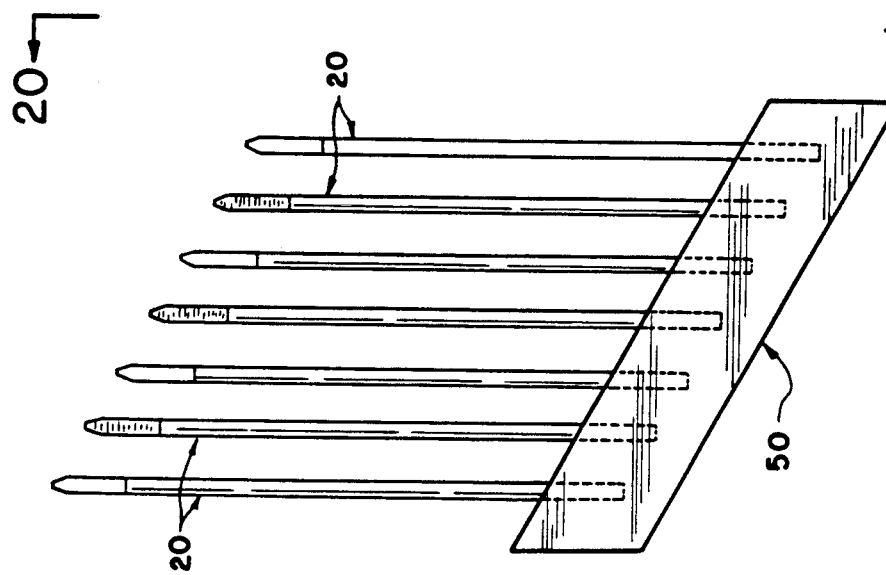
FIG. 19 is a front elevational view of an alternative form of the device of FIG. 17.

FIG. 17A schematically illustrates a device according to FIGS. 17 and 18 attached to a generally rectangular sign-like structure 42, with the flexible, plastic fingers 20 extending vertical from the top edge 44 of the structure. FIGS. 19 and 20 illustrate a device similar to FIGS. 17 and 18, but with a band 50 with fingers 20 which, in addition to being parallel to and co-planar with the plane of the band 50, extend at an angle thereto. FIG. 19A schematically illustrates a device according to FIGS. 19 and 20 attached to the diagonal edges of a diamond-shaped marine day marker 52, with the flexible, plastic fingers 20 extending vertical from the diagonal edge. As will be clear to those of ordinary skill, in the devices of FIGS. 17-20, the band can be attached to or integrally molded with the flexible plastic fingers.

As discussed above, the flexible plastic fingers are preferably made of Nylon 6/6. An additional benefit of such material over the use of metal is that it is non-corrosive, so that in time it does not corrode and leave corrosion evidence on the protected structure or objects under the protected structure. Further, the material is non-conductive, which is desirable when the device of the invention is applied to electrical cables. The flexible plastic fingers can be formed of electrical ties from about 3½ inches to about 6 inches in length, from about 0.010 inches to about 0.14 inches, and a thickness of about 0.039 inches (1 mm). Such electrical ties are particularly suitable for detering birds from landing on the wires and cables typically associated with boats. However, it is believed that with the principles of this invention in mind, the manner in which the flexible, plastic fingers can be used to deter birds from landing on other types of wire or cable-like structures will become readily apparent to those in the art.

As discussed above, a basic concept of the invention is that it provides plastic fingers which are designed to flex when a bird attempts to land thereon. An additional aspect of the invention relates to the ability of the flexible, plastic fingers to be visibly flexed by wind, vibration or movement of the protected wire or cable-like structure. Applicant has found that such flexing can visibly deter birds from even attempting to land on the device.

Still further, the concepts of the present invention, and specifically the use of the subassemblies described above, provides enormous flexibility to the manner in which the flexible, plastic fingers can be attached to a protected structure.

Thus, according to the principles of this invention, applicant has designed what is believed to be a unique way of constructing an anti-roosting device to physically deter birds from landing on a structure. With the present disclosure in mind, it is believed that various obvious modifications of the invention will become apparent to those of ordinary skill in the art.

I claim:

1. Apparatus for preventing roosting of birds on a wire or cable-like structure, comprising an array of flexible plastic fingers extending away from the wire or cable-like structure and disposed in a predetermined pattern, each finger having sufficient flexibility to enable the finger to flex relative to the wire or cable-like structure when a bird seeks to land thereon;

wherein each flexible finger has sufficient flexibility to enable the finger to flex relative to the wire or cable-like structure when subjected to forces such as wind, motion or vibration of the wire or cable-like structure;

wherein the cross section of the wire or cable-like structure has an outer periphery which enables the wire and cable-like structure to be circumscribed by said array of said flexible, plastic fingers, and wherein said array of flexible plastic fingers circumscribes the outer periphery of the wire or cable-like structure;

wherein said array of flexible, plastic fingers comprises a plurality of annular subassemblies of flexible plastic fingers connected to said wire or cable-like structure at predetermined spaced apart locations, each subassembly extending about the outer periphery of the wire or cable-like structure, and each subassembly including a plurality of flexible plastic fingers;

wherein the flexible plastic fingers of each subassembly extend radially away from the wire or cable-like structure and are spaced from each other about the outer periphery of the wire or cable-like structure, the fingers of each assembly being angularly offset from the fingers of the adjacent subassembly;

wherein a base strand connected with the wire or cable-like structure and a plurality of flexible plastic fingers secured to said base strand, each flexible plastic finger having an integral loop part for enabling the finger to be threaded onto said base strand, so that the subassembly can be formed by threading the loop parts of each of the flexible, plastic fingers onto the base strand; and, wherein said base strand comprises a longitudinally extending shaft with a tongue at one end and a buckle at the other end, the tongue and the shaft being adapted to mate with the buckle in a manner which enables the base strand to be tightened about the wire or cable-like structure.

2. Apparatus as set forth in claim 1, further including an orientation member connected to a plurality of said subassemblies, said orientation member being adapted to locate said plurality of subassemblies in predetermined orientations relative to each other and relative to the wire or cable-like structure.

3. Apparatus as set forth in claim 2, wherein said orientation member comprises a longitudinally extending plastic strip with a plurality of loop parts spaced longitudinally therealong, each of said loop parts being adapted to receive the tongue and shaft of a respective base strand, to enable a plurality of base strands to be secured to said longitudinally extending plastic strip.

4. Apparatus as set forth in claim 1, wherein each of said plastic fingers has a longitudinal shaft with a loop part at one end and a tongue part at the other end, the loop part of each finger being adapted to receive the tongue and shaft of the base strand to enable the finger to slide in a first direction along the shaft of the base strand in order to assemble a plurality of said plastic fingers with the base strand, the loop parts of said fingers being adapted to space the fingers a minimum distance from each other along the shaft of the base strand.

5. Apparatus for preventing roosting of birds on a wire or cable-like structure, comprising an array of flexible plastic fingers extending away from the wire or cable-like structure and disposed in a predetermined pattern, each finger having sufficient flexibility to enable the finger to flex relative to the wire or cable-like structure when a bird seeks to land thereon;

wherein each flexible finger has sufficient flexibility to enable the finger to flex relative to the wire or cable-like structure when subjected to forces such as wind, motion or vibration of the wire or cable-like structure;

wherein the cross section of the wire or cable-like structure has an outer periphery which enables the wire and cable-like structure to be circumscribed by said array of said flexible, plastic fingers, and wherein said array of flexible plastic fingers circumscribes the outer periphery of the wire or cable-like structure;

wherein said array of flexible, plastic fingers comprises a plurality of annular subassemblies of flexible plastic fingers connected to said wire or cable-like structure at predetermined spaced apart locations, each subassembly extending about the outer periphery of the wire or cable-like structure, and each subassembly including a plurality of flexible plastic fingers;

wherein the flexible plastic fingers of each subassembly extend radially away from the wire or cable-like structure and are spaced from each other about the outer periphery of the wire or cable-like structure, the fingers of each assembly being angularly offset from the fingers of the adjacent subassembly; and, wherein each subassembly comprises a base strand connected with the wire or cable-like structure and a plurality of flexible fingers connected with said base strand, said base strand comprising a longitudinally extending shaft with a tongue at one end and a buckle at the other end, the tongue and the shaft being adapted to be coupled with the buckle of the base strand to enable the base strand to be tightened about the wire or cable-like structure.

6. Apparatus as set forth in claim 5, further including an orientation member connected to a plurality of said subassemblies, said orientation member being adapted to locate said plurality of subassemblies in predetermined orientations relative to each other and relative to the wire or cable-like structure.

7. Apparatus as set forth in claim 6 wherein said orientation member, said base strand and said flexible, plastic fingers comprise an integrally molded device.

8. Apparatus as set forth in claim 5, wherein each of said plastic fingers has a longitudinal shaft with a loop part at one end and a tongue part at the other end, the loop part of each finger being adapted to receive the tongue and the shaft of the base strand and to enable the finger to slide in a first direction along the shaft of the base strand, the loop parts of each of the flexible, plastic fingers being adapted to space the fingers a minimum distance from each other along the shaft of the base strand.

9. Apparatus as set forth in claim 8, wherein said base strand is integrally molded with said flexible, plastic fingers.

10. Apparatus as set forth in claim 5, wherein said base strand is integrally molded with said flexible, plastic fingers.

11. A method of protecting a wire or cable-like structure from birds roosting thereon, comprising the steps of:

(a) providing a plurality of flexible plastic fingers, (b) securing the plurality of flexible plastic fingers to the wire or cable-like structure with the flexible plastic fingers extending away from the wire or cable-like structure;

(c) providing each of the plastic fingers with sufficient flexibility to enable the plastic finger to flex relative to the wire or cable-like structure when a bird attempts to land thereon, thereby deterring the bird from landing thereon;

wherein the step of providing a plurality of flexible plastic fingers comprises the step of forming a subassembly of a base and a plurality of longitudinally extending flexible, plastic fingers extending away from the base;

wherein the step of securing the plurality of flexible plastic fingers to the wire or cable-like structure comprises the step of securing the subassembly to the wire or cable-like structure by wrapping the base tightly about the wire or cable-like structure to secure the base to the wire or cable-like structure with the plastic fingers extending away from the wire or cable-like structure; and wherein said base comprises a longitudinally extending shaft having a buckle part at one end and a tongue at the other end, the tongue and the shaft being adapted to mate with the buckle to tighten the base about the wire or cable-like structure, the step of securing the plurality of flexible plastic fingers to the wire or cable-like structure comprising the step of tightening the base about the wire or cable-like structure.

12. A method as set forth in claim 11, including connecting the subassemblies to an orientation member which orients the subassemblies relative to each other, the step of securing the subassemblies to the wire or cable-like structure comprising the step of securing the orientation member in a desired location on the wire or cable-like structure, thereby to maintain the orientation of the subassemblies relative to each other on the wire or cable-like structure.

13. A method as set forth in claim 12, wherein the fingers, the base and the orientation member are integrally formed and secured together by molding.

14. A method as set forth in claim 11, wherein each plastic finger has an integral loop at one longitudinal end, the loop being insertable over the tongue and shaft of the base and slidable along the shaft of the base, the subassembly being formed by inserting the loops of the fingers over the tongue and shaft of the base and sliding the loops of the fingers along the shaft of the base to locate the fingers at desired points along the base.

15. A method as forth in claim 14, wherein the fingers and the base are integrally formed by molding.

16. Apparats for attachment to a structure for preventing roosting of birds on the structure, comprising a base, coupling means for attaching the base to the structure and an array of flexible plastic fingers extending away from the base in a predetermined pattern, said base being adapted to be attached to the structure to locate the array of flexible plastic fingers in a predetermined pattern on the structure, each finger having sufficient flexibility to enable the finger to flex relative to the base when a bird seeks to land thereon;

wherein the structure is a wire or cable-like structure and the base is adapted to be secured to said wire or cable-like structure so as to circumscribe the wire or cable-like structure, said array of flexible plastic fingers being located on said base such that said array of flexible plastic fingers is adapted to circumscribe the wire or cable-like structure;

wherein said base comprises a strand adapted to be connected with the wire or cable-like structure and said array of flexible fingers are secured to said strand, each flexible plastic finger having an integral loop part for enabling the finger to be threaded onto said strand, so that the array of flexible plastic fingers can be connected with said strand by threading the loop parts of each of the flexible, plastic fingers onto the strand; and wherein said strand comprises a longitudinally extending shaft with a tongue at one end and a buckle at the other end, the tongue and the shaft being adapted to mate with the buckle in a manner which enables the base to be tightened about the wire or cable-like structure.

17. Apparatus as set forth in claim 16, further an orientation member adapted to be connected to the wire or cable-like structure and to said strand, said orientation member being adapted to locate said strand in a predetermined orientation relative to the wire or cable-like structure.

18. Apparatus as set forth in claim 17 wherein said orientation member comprises a longitudinally extending plastic strip with a plurality of loop parts spaced longitudinally therealong, each of said loop parts being adapted to receive the tongue and shaft of a respective strand, to enable a plurality of strands to be secured to said longitudinally extending plastic strip.

19. Apparatus as set forth in claim 18 wherein said orientation member, said strand and said flexible, plastic fingers comprise an integrally molded device.

20. Apparatus for attachment to a structure for preventing roosting of birds on the structure, comprising a base, coupling means for attaching the base to the structure and an array of flexible plastic fingers extending away from the base in a predetermined pattern, said base being adapted to be attached to the structure to locate the array of flexible plastic fingers in a predetermined pattern on the structure, each finger having sufficient flexibility to enable the finger to flex relative to the base when a bird seeks to land thereon;

wherein the structure is a wire or cable-like structure and the base is adapted to be secured to said wire or cable-like structure so as to circumscribe the wire or cable-like structure, said array of flexible plastic fingers being located on said base such that said array of flexible plastic fingers is adapted to circumscribe the wire or cable-like structure;

wherein said base comprises a longitudinally extending strand with a tongue at one end and a buckle at the other end, the tongue and the shaft being adapted to mate with the buckle in a manner which enables the base to be tightened about the wire or cable-like structure.

21. Apparatus as set forth in claim 20 wherein said strand is integrally molded with said flexible, plastic fingers.

22. Apparatus for preventing roosting of birds on a wire or cable-like structure, comprising:

a flexible base member adapted to be tightened about the wire or cable-like structure to secure said flexible base member thereto, coupling structure attached to said base member, for securing the base member to said wire or cable-like structure, said coupling structure including a first coupling part located at one end of said base member and a second coupling part located elsewhere on said base member and adapted to mate with said first coupling part in a manner which enables said base member to be tightened about a wire or cable-like structure; and an array of flexible plastic fingers attached to said flexible base member and extending away from said flexible base member in a predetermined pattern, each finger having sufficient flexibility to enable the finger to flex relative to the wire or cable-like structure when a bird seeks to land thereon.

23. Apparatus as set forth in claim 22, wherein said array of plastic fingers is integrally molded with said base member.

24. Apparatus for preventing roosting of birds on a wire or cable-like structure, comprising:

a flexible base member adapted at least partially to encircle a selected portion of a wire of cable-like structure, coupling structure integrally formed with said base member, said coupling structure adapted to engage a selected portion of a wire or cable-like structure in a manner which secures said base member to the wire or cable-like structure with the base member at least partially encircling the selected portion of the wire or cable-like structure, and an array of flexible plastic fingers integrally formed with said flexible base member and extending away from said flexible base member in a predetermined pattern, said array of flexible fingers including a first series of flexible fingers and a second series of flexible fingers, said first and second series of flexible fingers being spaced from each other, each of said first and second series of flexible fingers comprising a plurality of flexible fingers, and each flexible plastic finger having sufficient flexibility to enable the finger to flex relative to the wire or cable-like structure when a bird seeks to land thereon.

25. Apparatus as set forth in claim 24, wherein said array of plastic fingers is integrally molded with said base member.

* * * * *

UNITED STATES PATENT AND TRADEMARK OFFICE
CERTIFICATE OF CORRECTION

PATENT NO.   :   5,058,335
DATED        :   October 22, 1991
INVENTOR(S)  :   Alan J. Richter It is certified that error appears in the above-identified patent and that said Letters Patent is hereby corrected as shown below:

On the title page, Item [76]: Inventors address should read:

-- 618 Atlantic Shores Boulevard, Hallandale, Florida 33009 --.

Signed and Sealed this

Twenty-fifth Day of January, 1994

*Attest:*

BRUCE LEHMAN

*Attesting Officer*     *Commissioner of Patents and Trademarks*